(12) United States Patent
Kitayama et al.

(10) Patent No.: US 6,407,021 B1
(45) Date of Patent: Jun. 18, 2002

(54) ULTRAVIOLET RADIATION-ABSORBING, COLORLESS, TRANSPARENT SODA-LIME SILICA GLASS

(75) Inventors: Masao Kitayama; Teiji Kita, both of Hyogo (JP)

(73) Assignee: Nihon Yamamura Glass Co., Ltd., Hyogo (JP)

( * ) Notice: Subject to any disclaimer, the term of this patent is extended or adjusted under 35 U.S.C. 154(b) by 0 days.

(21) Appl. No.: 09/762,465

(22) PCT Filed: Aug. 24, 1999

(86) PCT No.: PCT/JP99/04564

§ 371 (c)(1),
(2), (4) Date: Feb. 7, 2001

(87) PCT Pub. No.: WO00/12441

PCT Pub. Date: Mar. 9, 2000

(30) Foreign Application Priority Data

Aug. 26, 1998 (JP) ............................ 10-257605

(51) Int. Cl.$^7$ ............................................. C03C 3/087
(52) U.S. Cl. ............................................. 501/70; 501/71
(58) Field of Search ..................... 501/70, 71

(56) References Cited

U.S. PATENT DOCUMENTS

| | | | |
|---|---|---|---|
| 5,030,593 A | * | 7/1991 | Heithoff |
| 5,030,594 A | * | 7/1991 | Heithoff |
| 5,558,942 A | * | 9/1996 | Itoh et al. |
| 5,843,856 A | * | 12/1998 | Suha et al. |
| 5,902,665 A | * | 5/1999 | Kuroda |

FOREIGN PATENT DOCUMENTS

| | | | |
|---|---|---|---|
| JP | 5-178639 | | 7/1993 |
| JP | 09301736 A | * | 11/1997 |
| JP | 10-218642 | | 8/1998 |
| JP | 10-226534 | | 8/1998 |
| WO | WO 95/13993 | * | 5/1995 |

* cited by examiner

Primary Examiner—David Sample
(74) Attorney, Agent, or Firm—Millen, White, Zelano & Branigan, P. C.

(57) ABSTRACT

An ultraviolet radiation-absorbing, colorless, transparent soda-lime-silica glass as well as glass bottles formed out of the glass are disclosed which, while maintaining high transmittance to light in the visible region and thereby allowing the contents to be seen clearly, absorbs ultraviolet radiation and thus prevents coloration, discoloration, fading in color or deterioration of the flavor of the contents caused by ultraviolet radiation. The glass is characterized in that its composition includes, in % by weight, $SO_3$ ... 0.15–0.4%; Cerium oxide ... 0.2–1% (calculated as $CeO_2$); $Fe_2O_3$ ... 0.01–0.08%; FeO ... 0–0.008%; Manganese oxide ... 0.01–0.08% (calculated as MnO); and Cobalt oxide ... 0–0.0005% (calculated as CoO).

23 Claims, 2 Drawing Sheets

Fig. 2

ULTRAVIOLET RADIATION-ABSORBING, COLORLESS, TRANSPARENT SODA-LIME SILICA GLASS

TECHNICAL FIELD

The present invention relates to an ultraviolet radiation-absorbing, colorless, transparent soda-lime-silica glass, as well as to glass bottles formed out of the glass. In more detail, the present invention relates to an ultraviolet radiation-absorbing, colorless, transparent soda-lime-silica glass as well as to glass bottles formed out of the glass which has no greenish or bluish tint and which can prevent coloration, discoloration, fading in color or deterioration of the flavor of the contents caused by ultraviolet radiation and, inter alia, coloration of refined "sake", coloration or fading in color of wines, and deterioration of the flavor of refined "sake" and wines.

BACKGROUND ART

In order to prevent light-induced coloration, discoloration, fading in color or deterioration of the flavor of their content beverages, amber, green or blue bottles have been widely used for refined "sake" or for beer. All of those glass bottles are deeply colored, which prevent their contents from being seen clearly as they are through the bottles. Thus, there have been needs for transparent, colorless glass bottles with high brightness which thereby allow their contents to be seen more clearly.

In majority of cases, however, transparent, colorless glass with high brightness has, at the same time, high transmittance to ultraviolet radiation. Ultraviolet radiation passing through a glass bottle is apt to induce coloration, discoloration or fading in color of its contents. In the case where its content is refined "sake", inter alia, its flavor would be deteriorated along with a yellowing in color, thereby greatly impairing its commodity value. In the case of wines, there also are problems of their coloration or fading in color and deterioration of their flavor.

As a means to solve these problems, an ultraviolet radiation-absorbing, colorless soda-lime glass is disclosed in Japanese Unexamined Patent Publication No. S52-47812. In this patent, the glass contains $CeO_2$ and $V_2O_5$ as ultraviolet radiation absorbents, and $MnO_2$ or Se and, as needed, $Co_3O_4$ as decolorizing agents. This glass, however, runs a substantial risk of undergoing coloration as a result of solarization because of coexistence of $CeO_2$ and $V_2O_5$. Japanese Patent No. 2528579 and Japanese Laid-open Patent Publication No. H8-506314 disclose glasses absorbing ultraviolet and infrared radiation which contains $Fe_2O_3$, FeO, $CeO_2$ and manganese oxide. However, as these glasses have a high total iron content together with a high content of FeO, a green to blue color in these glasses is unavoidable. This renders those glasses unsatisfactory as glasses used for producing colorless, transparent bottles with high brightness that allow their contents to be seen more clearly.

Therefore, colorless, transparent, ultraviolet radiation-absorbing glass bottles have been needed which, while allowing their contents to be seen clearly on a store shelf due to their high transmittance to light in the visible region, enable to keep their contents from being exposed to ultraviolet radiation in the process of distribution and on a store shelf.

The objective of the present invention is to provide an ultraviolet radiation-absorbing, colorless, transparent soda-lime-silica glass as well as to glass bottles formed out of the glass which, while maintaining high transmittance to light in the visible region and thereby allowing the contents to be seen clearly, absorbs ultraviolet radiation and thereby prevents coloration, discoloration, fading in color or deterioration of the flavor of the contents caused by ultraviolet radiation.

DISCLOSURE OF INVENTION

The present inventors found, as a result of repeated studies to reach the above objective, that an ultraviolet radiation-absorbing, colorless, transparent soda-lime-silica glass is obtained which is highly absorptive of ultraviolet radiation while having high transmittance to visible light, by adding to a conventional basic composition of soda-lime-silica glass specific proportions of $SO_3$, cerium oxide, $Fe_2O_3$, FeO, manganese oxide and, as needed, cobalt oxide. The present invention was accomplished based on this finding.

Thus, the present invention provides an ultraviolet radiation-absorbing, colorless, transparent soda-lime-silica glass which is characterized in that its composition includes, in % by weight,

| | |
|---|---|
| $SO_3$ | 0.15–0.4% |
| Cerium oxide | 0.2–1% (calculated as $CeO_2$) |
| $Fe_2O_3$ | 0.01–0.08% |
| FeO | 0–0.008% |
| Manganese oxide | 0.01–0.08% (calculated as MnO), and |
| Cobalt oxide | 0–0.0005% (calculated as CoO). |

Herein, "cerium oxide" means both of $CeO_2$ and $Ce_2O_3$, and its "% by weight" is expressed as a value obtainable when all the contained cerium oxide is replaced with $CeO_2$. Likewise, "manganese oxide" means both of MnO and $Mn_2O_3$, and its "% by weight" is expressed as a value obtainable when all the contained manganese oxide is replaced with MnO. In addition, "cobalt oxide" is also expressed as a value obtainable when all the contained cobalt oxide is replaced with CoO.

The present invention further provides a glass bottle formed out of the above-identified ultraviolet radiation-absorbing, colorless, transparent soda-lime-silica glass.

As mentioned above, the compositional characteristic of the ultraviolet radiation-absorbing, colorless, transparent soda-lime-silica glass of the present invention consists in that it contains, in specific proportions, $SO_3$, cerium oxide, $Fe_2O_3$, FeO, manganese oxide and, as needed, cobalt oxide. The basic composition of soda-lime-silica glass may be in a conventional range. However, considering needs for high chemical durability, eliminated possibility of devitrification and proper easiness of melting, it is preferable that the ultraviolet radiation-absorbing, colorless, transparent soda-lime-silica glass of the present invention typically comprises, in % by weight:

| | |
|---|---|
| $SiO_2$ | 65–75% |
| $Al_2O_3$ | 0–5% |
| CaO | 6–15% |
| MgO | 0–4% |
| $Na_2O$ | 10–17% |
| $K_2O$ | 0–4% |
| $SO_3$ | 0.15–0.4% |
| Cerium oxide | 0.2–1% (calculated as $CeO_2$) |
| $Fe_2O_3$ | 0.01–0.08% |

-continued

| | |
|---|---|
| FeO | 0–0.008% |
| Manganese oxide | 0.01–0.08% (calculated as MnO) |
| Cobalt oxide | 0–0.0005% (calculated as CoO). |

In addition, to enhance the reliability of the total performance of the glass of the present invention, it is more preferable that the ultraviolet radiation-absorbing, colorless, transparent soda-lime-silica glass of the present invention is characterized in that its composition includes, in % by weight,

| | |
|---|---|
| $SO_3$ | 0.2–0.38% |
| Cerium oxide | 0.2–1% (calculated as $CeO_2$) |
| $Fe_2O_3$ | 0.015–0.06% |
| FeO | 0–0.006% |
| Manganese oxide | 0.013–0.07% (calculated as MnO), and |
| Cobalt oxide | 0–0.0005% (calculated as CoO). |

Furthermore, to further enhance the reliability of the total performance of the glass of the present invention, it is most preferable that the ultraviolet radiation-absorbing, colorless, transparent soda-lime-silica glass of the present invention is characterized in that its composition includes, in % by weight,

| | |
|---|---|
| $SO_3$ | 0.24–0.35% |
| Cerium oxide | 0.3–0.8% (calculated as $CeO_2$) |
| $Fe_2O_3$ | 0.02–0.04% |
| FeO | 0–0.004% |
| Manganese oxide | 0.02–0.05% (calculated as MnO), and |
| Cobalt oxide | 0–0.0003% (calculated as CoO). |

Furthermore, it is more preferable that the ultraviolet radiation-absorbing, colorless, transparent soda-lime-silica glass of the present invention comprises, in % by weight:

| | |
|---|---|
| $SiO_2$ | 65–75% |
| $Al_2O_3$ | 0–5% |
| CaO | 6–15% |
| MgO | 0–4% |
| $Na_2O$ | 10–17% |
| $K_2O$ | 0–4% |
| $SO_3$ | 0.2–0.38% |
| Cerium oxide | 0.2–1% (calculated as $CeO_2$) |
| $Fe_2O_3$ | 0.015–0.06% |
| FeO | 0–0.006% |
| Manganese oxide | 0.013–0.07% (calculated as MnO) |
| Cobalt oxide | 0–0.0005% (calculated as CoO). |

Still further, it is most preferable that the ultraviolet radiation-absorbing, colorless, transparent soda-lime-silica glass of the present invention comprises, in % by weight:

| | |
|---|---|
| $SiO_2$ | 68–74% |
| $Al_2O_3$ | 1–4% |
| CaO | 8–13% |
| MgO | 0.1–3% |
| $Na_2O$ | 11–15% |
| $K_2O$ | 0.1–3% |
| $SO_3$ | 0.24–0.35% |
| Cerium oxide | 0.3–0.8% (calculated as $CeO_2$) |
| $Fe_2O_3$ | 0.02–0.04% |
| FeO | 0–0.004% |
| Manganese oxide | 0.02–0.05% (calculated as MnO) |
| Cobalt oxide | 0–0.0003% (calculated as CoO). |

On a transmittance curve obtained with a 3.5-mm thick sample, the ultraviolet radiation-absorbing, colorless, transparent soda-lime-silica glass of the present invention preferably has transmittance of not more than 4.5 % at the wavelength of 330 nm and, in the visible region of 420–780 nm, transmittance of not less than 88 % without having absorption at any particular wavelength.

In addition, the ultraviolet radiation-absorbing, colorless, transparent soda-lime-silica glass of the present invention preferably has dominant wavelength ($\lambda_d$) at 565–575 nm.

The ultraviolet radiation-absorbing, colorless, transparent soda-lime-silica glass of the present invention has an excellent ability to absorb ultraviolet radiation, in particular ultraviolet radiation at the wavelength of 330 nm. Therefore, when used in the form of glass bottles, it can prevent coloration, discoloration, fading in color or deterioration of the flavor of their contents caused by light, and is highly effective, inter alia, in preventing not only a yellowing in color and deterioration of the flavor of refined "sake", which is sensitive to ultraviolet radiation at wavelengths around 330 nm, but also coloration, fading in color or deterioration of the flavor of wines.

BEST MODE FOR CARRYING OUT THE INVENTION

In general, $SiO_2$, which is a glass network-former, is contained preferably at a proportion of 65–75% by weight. This is because a $SiO_2$ content below 65% by weight might reduce chemical durability of the glass and, conversely, a $SiO_2$ content over 75% by weight might render the glass prone to devitrification. Considering chemical durability and proneness to devitrification of the glass, it is more preferable that the content of $SiO_2$ is at a proportion of 68–74% by weight.

$Al_2O_3$, which is an intermediate oxide of glass, serves to enhance chemical durability of the glass. Inclusion of $Al_2O_3$ is not essential. When it is included, it is generally preferable that its proportion is not more than 5% by weight. This is because an $Al_2O_3$ content over 5% by weight might render the glass difficult to melt. Considering chemical durability and ease of melting of the glass, it is more preferable that the content of $Al_2O_3$ is at a proportion of 1–4% by weight.

CaO, which is a glass network-modifier, serves to enhance chemical durability of the glass as well as to improve its easiness of melting. In general, CaO is contained preferably at a proportion of 6–15% by weight. This is because a CaO content below 6% by weight might render the chemical durability insufficient, and, conversely, a CaO content over 15% by weight might render the glass prone to devitrification. Considering chemical durability, proper ease of melting and proneness to devitrification of the glass, it is more preferable that the content of CaO is at a proportion of 8–13% by weight.

MgO, which is a glass network-modifier, like CaO, serves to enhance chemical durability of the glass as well as to improve ease of melting. Inclusion of MgO is not essential. When it is included, it is generally preferable that its proportion is not more than 4% by weight. This is because a MgO content over 4% by weight might render the glass prone to devitrification. Considering chemical durability, ease of melting and proneness to devitrification of the glass, it is more preferable that the content of MgO is at a proportion of 0.1–3% by weight.

$Na_2O$, which is a glass network-modifier, has an effect to promote melting of raw materials. Generally, $Na_2O$ is contained preferably at a proportion of 10–17% by weight. This is because a $Na_2O$ content below 10% by weight renders the glass difficult to melt, and, conversely, a $Na_2O$ content over 17% by weight might reduce chemical durability of the glass. Considering ease of melting and chemical durability of the glass, it is more preferable that the content of $Na_2O$ is at a proportion of 11–15% by weight.

$K_2O$, which is a glass network-modifier, serves like $Na_2O$ to promote melting of raw materials. Inclusion of $K_2O$ is not essential. When it is included, it is generally preferable that its proportion is not more than 4% by weight. This is because a $K_2O$ content over 4% by weight renders the glass prone to devitrification. Considering ease of melting and proneness to devitrification of the glass, it is more preferable that the content of $K_2O$ is at a proportion of 0.1–3% by weight.

$SO_3$ may be a residue in the glass of the fining agents that were added to the batch as a combination of salt cake (sodium sulfate) and carbon. The amounts of salt cake, carbon and other oxidizing and reducing agents that govern the redox of the batch may be determined so that the content of $SO_3$ will fall within the range of 0.15–0.4% by weight. The lower limit is set at 0.15% by weight because a lower content of $SO_3$ in the glass would render the glass too reductive, which then would increase the ratio of FeO to $Fe_2O_3$ and decrease the ratio of $Mn_2O_3$ to MnO, even if desired amounts of cerium oxide and manganese oxide were added, thus giving the glass a greenish to bluish tint. The upper limit is set at 0.4% by weight because higher content of $SO_3$ in the glass might cause seed to be left in the glass. Considering prevention of pale greenish to pale bluish coloration of the glass and removal of seed, it is preferable that the content of $SO_3$ in the glass is controlled to fall within the range of 0.2–0.38% by weight, and it is more preferable within the range of 0.24–0.35% by weight.

Cerium oxide serves as an absorbent for ultraviolet-radiation and is contained as $CeO_2$ and $Ce_2O_3$ in the glass of the present invention. Although the mutual proportion between $CeO_2$ and $Ce_2O_3$ varies depending on the content of $SO_3$ and therefore is not clear, they are contained preferably at 0.2–1% by weight in total (but calculated as $CeO_2$). This is because a total content of cerium oxide below 0.2% by weight might provide insufficient effect to absorb ultraviolet radiation, and, depending on the content of $SO_3$, might allow the ratio of FeO to $Fe_2O_3$ to increase, thereby giving the glass a bluish tint. It is also because, conversely, the glass would acquire an undesired fluorescent color when its content is over 1% by weight. Considering the creation of an ultraviolet radiation-absorbing effect and prevention of emergence of fluorescence in the glass, it is more preferable that the total content of cerium oxide is at a proportion of 0.3–0.8% by weight.

$Fe_2O_3$, like cerium oxide, has an ultraviolet radiation-absorbing effect. However, $Fe_2O_3$ can effectively absorb ultraviolet radiation around 330 nm, which cerium oxide by itself is unable to absorb sufficiently. Ultraviolet radiation at this wavelength is most relevant to the change in quality of refined "sake". $Fe_2O_3$ is contained preferably at a proportion of 0.01–0.08% by weight. This is because a $Fe_2O_3$ content below 0.01% by weight might provide the above effect only insufficiently, and, conversely, a $Fe_2O_3$ content over 0.08% by weight might make it difficult for $Mn^{3+}$ ion to decolorize yellow-green coloration caused by $Fe^{3+}$ ion. Considering desirable absorption of ultraviolet radiation by the glass, in particular around 330 nm, and prevention of coloration, it is more preferable that the content of $Fe_2O_3$ is at a proportion of 0.015–0.06% by weight, and it is still more preferable at a proportion of 0.02–0.04% by weight.

FeO is a component which is inevitably produced during the glass melting process from contaminant iron in silica sand in the glass batch, or from iron added as $Fe_2O_3$ to the batch. FeO is not only an unnecessary component for obtaining the ultraviolet radiation-absorbing, colorless, transparent soda-lime-silica glass of the present invention, but its content must be not more than 0.008% by weight. This is because a FeO content over 0.008% by weight might give the glass a bluish tint. In order to constantly obtain colorless and transparent glass without fail, it is preferable that the content of FeO is not more than 0.006% by weight, and it is more preferable not more than 0.004% by weight.

Manganese oxide, which is an essential component for decolorizing the yellow-green coloration caused by $Fe_2O_3$ contained as an ultraviolet radiation absorbent, is contained preferably at 0.01–0.08% by weight in accordance with the above-described contents of $SO_3$, cerium oxide, $Fe_2O_3$ and FeO. Although manganese oxide is present in the glass both as MnO and $Mn_2O_3$, at unknown mutual proportion, it is $Mn^{3+}$ ion that has a decolorizing effect. The above-described content of manganese oxide is the sum of MnO and $Mn_2O_3$ (but calculated as MnO). A total content of manganese oxide below 0.01% by weight might provide an insufficient decolorizing effect. Conversely, a total content of manganese oxide over 0.08% by weight might lead to red-purple coloration due to excessive $Mn^{3+}$ ion that cannot be fully decolorized even by inclusion of cobalt oxide as mentioned below or, even if it is successfully decolorized, might reduce the brightness of the glass, thereby impairing its transparent appearance. Considering decolorizing effect, it is more preferable that the total content of manganese oxide is at a proportion of 0.013–0.07% by weight, and it is still more preferable at a proportion of 0.02–0.05% by weight.

Cobalt oxide has an effect to decolorize red-purple coloration due to $Mn^{3+}$ ion. Addition of cobalt oxide is not essential. Where somewhat excess $Mn^{3+}$ ion is present, cobalt oxide may be added as needed at or below 0.0005% by weight (calculated as CoO) to decolorize red-purple coloration due to $Mn^{3+}$ ion. A total content of cobalt oxide over 0.0005% by weight might reduce the brightness of the glass, thereby impairing its transparent appearance. Considering the transparent appearance of the glass, it is preferable that the total content of cobalt oxide is not more than 0.0003% by weight.

According to the above range of composition, an ultraviolet radiation-absorbing, colorless, transparent soda-lime-silica glass can be obtained which, on a transmittance curve obtained with a 3.5 mm thick sample, has transmittance of not more than 4.5% at the wavelength of 330 nm and, in the visible region of 420–780 nm, transmittance of not less than 88% without having absorption at any particular wavelength. Keeping the transmittance at or below 4.5% at the wavelength of 330 nm is particularly effective in preventing a yellowing in color and deterioration of the flavor of refined "sake". More preferably, the transmittance at the wavelength of 330 nm is not more than 4%.

It is preferable that the dominant wavelength ($\lambda_d$) of the glass of the present invention is 565–575 nm. This is because this type of glass, which has no absorption at any particular wavelength in the visible region, would have a bluish tint when its dominant wavelength ($\lambda_d$) is below 565 nm, and a reddish tint where it is over 575 nm. To be completely colorless and transparent, the dominant wavelength ($\lambda_d$) of the glass of the present invention is more preferably 567–573 nm.

A general method of producing the glass and glass bottles of the present invention is as follows. Briefly, to 100 parts by weight of silica sand are added 25–36 parts by weight of soda ash, 23–33 parts by weight of limestone, 0.03–0.15 part by weight of carbon (85% by weight of purity), 0.7–2.0 parts by weight of salt cake (sodium sulfate), 0.26–1.4 parts by weight of cerium oxide (as $CeO_2$) and 0–0.08 part by weight of iron oxide (added as $Fe_2O_3$ when the amount of contaminant iron in the silica sand is insufficient), the last two of which, i.e., cerium oxide and iron oxide, serve as ultraviolet radiation absorbents, and 0.015–0.17 part by weight of manganese oxide (as $MnO_2$ of 80% by weight of purity) and 0–0.0007 part by weight of cobalt oxide (as $Co_3O_4$), the last two of which, i.e., manganese oxide and cobalt oxide, serve as decolorizing agents, and thus prepared batch composition is melted at 1400–1500° C., then adjusted to 1200–1350° C. in a working end, passed through a feeder and then into a molding machine, where the glass is formed into bottles at a temperature range of 700–1000° C. Formed bottles are introduced into an annealing lehr so that strain is removed at 500–600° C., and cooled over 30 min to 2 hrs to ambient temperature to provide the final product.

Although soda-lime-silica glass usually contains as a component several % by weight of $Al_2O_3$, other raw materials such as alumina, aluminium hydroxide and feldspar may be further added to adjust the composition when the amount of the contaminant alumina component in the silica sand is insufficient.

Where cullet is employed, blending proportions of the batch may be modified in accordance with the amounts of $SO_3$, cerium oxide, iron oxide, manganese oxide and cobalt oxide contained in the cullet.

EXAMPLES

The present invention is described in further detail below with reference to examples. However, it is not intended that the present invention be limited to the examples.

In the examples and the control examples, brightness (Y), dominant wavelength ($\lambda_d$), excitation purity (Pe) were calculated by the CIE method provided in JIS Z 8701 based on transmittance curves obtained by measuring 3.5-mm thick, polished samples on a spectrophotometer [U-3410, manufactured by HITACHI, LTD.] and converting the values into those corresponding to 10-mm thick samples.

Compositional analysis of the glass was made on a X-ray fluorescence analyzer (3070: manufactured by RIGAKU). The proportion between $Fe_2O_3$ and FeO was calculated based on the absorbance measured at the wavelength of 1000 nm on the spectrophotometer.

Example 1

A batch composition was prepared by weighing and mixing the following components.

| | |
|---|---|
| Kemerton silica sand | 100 parts by weight |
| Soda ash | 27.5 parts by weight |
| Limestone | 27.5 parts by weight |
| Salt cake (sodium sulfate) | 1.6 parts by weight |
| Carbon (85% by weight of purity) | 0.06 part by weight |
| $CeO_2$ | 0.85 part by weight |
| $MnO_2$ (80% by weight of purity) | 0.06 part by weight |
| $Co_3O_4$ | 0.00015 part by weight |

The obtained batch composition was introduced into a continuous tank furnace having a melting capacity of 150 t/day and melted at a glass melting temperature of 1450° C. for 38 hours, then passed through a feeder at 1270° C., molded and passed along a line equipped with a conventional annealing lehr to obtain bottles having a capacity of 300 mL.

Figure 1:
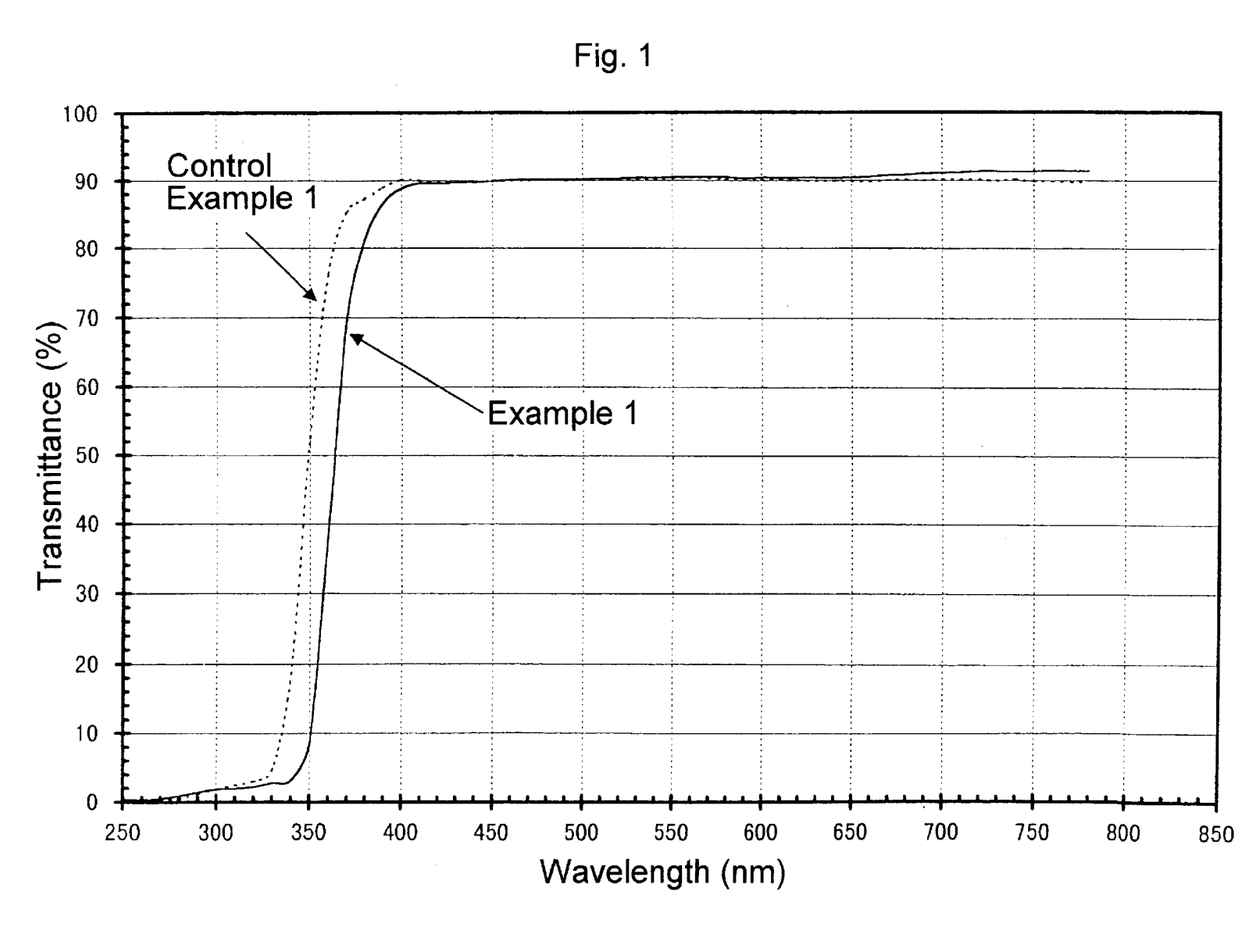
FIG. 1 is a graph illustrating the transmittance curves of the glasses of Example 1 and Control Example 1 in a wavelength range of 250–780 nm.
Figure 2:
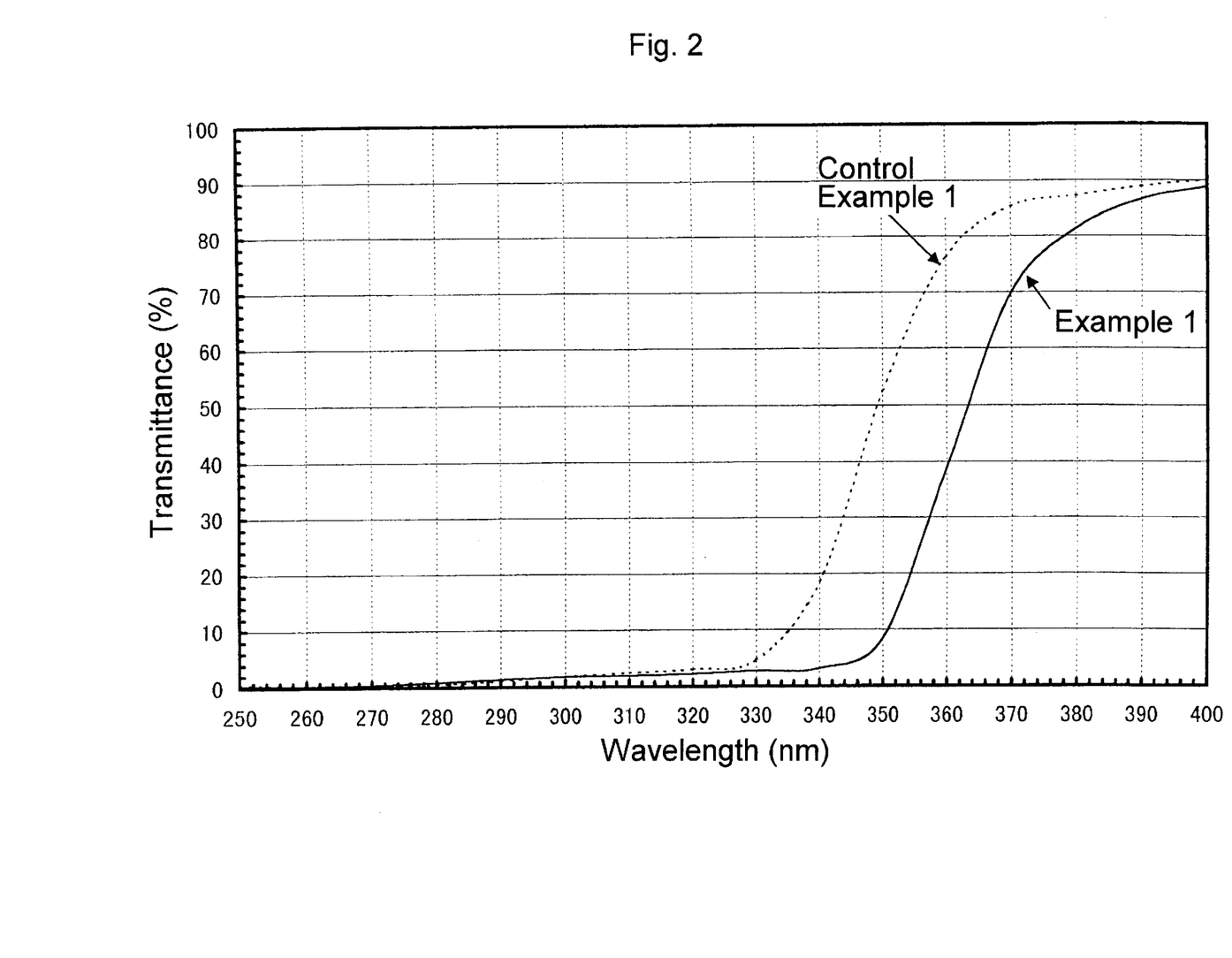
FIG. 2 is a graph illustrating the transmittance curves of the glasses of Example 1 and Control Example 1 in a wavelength range of 250–400 nm.

A sample for measurement was cut out of a glass bottle thus obtained, polished and measured to obtain a transmittance curve on the spectrophotometer. The transmittance curve thus obtained is shown in FIGS. 1 and 2. This glass bottle, as calculated for sample thickness of 10 mm, had brightness (Y) of 87.0%, dominant wavelength ($\lambda_d$) of 572.5 nm, and excitation purity (Pe) of 1.1%. In addition, its transmittance at 330 nm was 2.8%. Furthermore, in the visible region of 420–780 nm, its transmittance was not less than 88% without any apparent rise or fall in absorption at a particular wavelength. Thus, this glass bottle is proved to have an excellent ability to absorb ultraviolet radiation while being colorless and transparent.

Compositional analysis of this glass by X-ray fluorescence spectrometry (but by spectrophotometry with regard to the proportion between $Fe_2O_3$ and FeO) gave the following proportions (% by weight) in the composition.

| | |
|---|---|
| $SiO_2$ | 71% |
| $Al_2O_3$ | 2% |
| CaO | 11.3% |
| MgO | 0.15% |
| $Na_2O$ | 12.5% |
| $K_2O$ | 1.4% |
| $SO_3$ | 0.30% |
| Cerium oxide | 0.65% (calculated as $CeO_2$) |
| $Fe_2O_3$ | 0.028% |
| FeO | 0.0018% |
| Manganese oxide | 0.030% (calculated as MnO) |
| Cobalt oxide | 0.00012% (calculated as CoO) |

Control Example 1

A batch composition was prepared by weighing and mixing the following components. Using this batch composition, glass bottles were produced by the same method as in Example 1, which had a capacity of 300 mL.

| | |
|---|---|
| Kemerton silica sand | 100 parts by weight |
| Soda ash | 27.5 parts by weight |
| Limestone | 27.5 parts by weight |
| Salt cake (sodium sulfate) | 1.6 parts by weight |
| Carbon (85% by weight of purity) | 0.06 part by weight |
| $CeO_2$ | 0.15 part by weight |
| $MnO_2$ (80% by weight of purity) | 0.045 part by weight |
| $Co_3O_4$ | 0.00015 part by weight |

A transmittance curve was obtained with the glass bottles of the Control Example 1 above in the same manner as in Example 1. The transmittance curve thus obtained is shown in FIGS. 1 and 2. Color analysis carried out in the same manner showed that it had brightness (Y) of 86.6%, dominant wavelength ($\lambda_d$) of 560.6 nm and excitation purity (Pe) of 0.41%. Transmittance at 330 nm was 5.0%. Furthermore, although the transmittance was not less than 88% in the visible region of 420–780 nm, the transmittance at the range of 650–780 nm was lower by about 2% than that obtained in Example 1. These data indicate that the glass bottle of Control Example 1 has insufficient ability to absorb ultraviolet radiation, in particular around 330 nm, and has a somewhat bluish tint.

Compositional analysis of the glass of Control Example 1 by X-ray fluorescence spectrometry (but by spectrophotometry with regard to the proportion between $Fe_2O_3$ and FeO) gave the following proportions (% by weight) in the composition.

| | |
|---|---|
| $SiO_2$ | 71% |
| $Al_2O_3$ | 2% |
| CaO | 11.3% |
| MgO | 0.15% |
| $Na_2O$ | 12.5% |
| $K_2O$ | 1.4% |
| $SO_3$ | 0.25% |
| Cerium oxide | 0.11% (calculated as $CeO_2$) |
| $Fe_2O_3$ | 0.021% |
| FeO | 0.006% |
| Manganese oxide | 0.027% (calculated as MnO) |
| Cobalt oxide | 0.00012% (calculated as CoO) |

Control Example 2

A batch composition was prepared by weighing and mixing the following components. Using this batch composition, glass bottles were produced by the same method as in Example 1, which had a capacity of 300 mL.

| | |
|---|---|
| Kemerton silica sand | 100 parts by weight |
| Soda ash | 27.5 parts by weight |
| Limestone | 27.5 parts by weight |
| Salt cake (sodium sulfate) | 1.0 parts by weight |
| Carbon (85% by weight of purity) | 0.06 part by weight |
| $CeO_2$ | 0.26 part by weight |
| $MnO_2$ (80% by weight of purity) | 0.05 part by weight |
| $Co_3O_4$ | 0.0001 part by weight |

A transmittance curve was obtained with the glass bottles of the Control Example 2 above in the same manner as in Example 1, and color analysis carried out in the same manner, showing that it had brightness (Y) of 88.9%, dominant wavelength ($\lambda_d$) of 561.8 nm and excitation purity (Pe) of 0.71%. Transmittance at 330 nm was 3.6%. Furthermore, within the visible region of 420–780 nm, transmittance around 420–500 nm slightly increased. This indicates that the glass bottles of Control Example 2 has a slightly bluish tint.

Compositional analysis of the glass of Control Example 2 by X-ray fluorescence spectrometry (but by spectrophotometry with regard to the proportion between $Fe_2O_3$ and FeO) gave the following proportions (% by weight) in the composition.

| | |
|---|---|
| $SiO_2$ | 71% |
| $Al_2O_3$ | 2% |
| CaO | 11.3% |
| MgO | 0.15% |
| NaO | 12.5% |
| $K_2O$ | 1.4% |
| $SO_3$ | 0.19% |
| Cerium oxide | 0.20% (calculated as $CeO_2$) |
| $Fe_2O_3$ | 0.022% |
| FeO | 0.009% |
| Manganese oxide | 0.025% (calculated as MnO) |
| Cobalt oxide | 0.0001% (calculated as CoO) |

Examples 2–15

Glass bottles were produced in the same manner as in Example 1 except for modifications of blending proportions of batches.

The batch composition, glass composition, color and transmittance of each of Examples 1–15 and Control Examples 1 and 2 are shown collectively in Tables 1–3 below. In those tables, the color values are those calculated for sample thickness of 10 mm, and the values of transmittance are those obtained by measurement with 3.5-mm thick samples. From these tables, the glass of any of Examples 1–15 was confirmed to have an excellent ability to absorb ultraviolet radiation while being colorless and transparent.

TABLE 1

| | Example 1 | Example 2 | Example 3 | Example 4 | Example 5 |
|---|---|---|---|---|---|
| Batch composition (part(s) by weight) | | | | | |
| Kemerton silica sand | 100 | 100 | 100 | 100 | 100 |
| Soda ash | 27.5 | 27.5 | 27.5 | 27.5 | 27.5 |
| Limestone | 27.5 | 27.5 | 27.5 | 27.5 | 27.5 |
| Salt cake | 1.6 | 1.4 | 1.4 | 1.4 | 1.4 |
| Carbon (85%) | 0.06 | 0.03 | 0.06 | 0.06 | 0.06 |
| $CeO_2$ | 0.85 | 0.80 | 0.80 | 0.89 | 0.80 |
| $MnO_2$ (80%) | 0.06 | 0.05 | 0.03 | 0.05 | 0.07 |
| $Co_3O_4$ | 0.00015 | — | — | — | — |
| Glass composition (% by weight) | | | | | |
| $SiO_2$ | 71 | 71 | 71 | 71 | 71 |
| $Al_2O_3$ | 2 | 2 | 2 | 2 | 2 |
| CaO | 11.3 | 11.3 | 11.3 | 11.3 | 11.3 |
| MgO | 0.15 | 0.15 | 0.15 | 0.15 | 0.15 |

TABLE 1-continued

|  | Example 1 | Example 2 | Example 3 | Example 4 | Example 5 |
|---|---|---|---|---|---|
| $Na_2O$ | 12.5 | 12.5 | 12.5 | 12.5 | 12.5 |
| $K_2O$ | 1.4 | 1.4 | 1.4 | 1.4 | 1.4 |
| $SO_3$ | 0.30 | 0.34 | 0.23 | 0.27 | 0.29 |
| Cerium oxide (calculated as $CeO_2$) | 0.65 | 0.59 | 0.60 | 0.60 | 0.60 |
| $Fe_2O_3$ | 0.028 | 0.028 | 0.028 | 0.028 | 0.028 |
| FeO | 0.0018 | 0.0017 | 0.0018 | 0.0017 | 0.0016 |
| Manganese oxide (calculated as MnO) | 0.030 | 0.024 | 0.012 | 0.024 | 0.037 |
| Cobalt oxide (calculated as CoO) | 0.00012 | — | — | — | — |
| Color values |  |  |  |  |  |
| Y (%) | 87.0 | 87.7 | 88.6 | 88.0 | 87.6 |
| $\lambda_d$(nm) | 572.5 | 573.3 | 569.3 | 571.6 | 572.9 |
| Pe (%) | 1.1 | 1.5 | 1.3 | 1.3 | 1.4 |
| Transmittance (%) (330 nm) | 2.8 | 3.1 | 3.2 | 3.3 | 3.2 |
| Transmittance (%) (420~780 nm) | >88 | >88 | >88 | >88 | >88 |

TABLE 2

|  | Example 6 | Example 7 | Example 8 | Example 9 | Example 10 |
|---|---|---|---|---|---|
| Batch composition (part(s) by weight) |  |  |  |  |  |
| Kemerton silica sand | 100 | 100 | 100 | 100 | 100 |
| Soda ash | 27.5 | 27.5 | 27.5 | 27.5 | 27.5 |
| Limestone | 27.5 | 27.5 | 27.5 | 27.5 | 27.5 |
| Salt cake | 1.4 | 1.4 | 1.4 | 1.5 | 1.6 |
| Carbon (85%) | 0.06 | 0.05 | 0.04 | 0.06 | 0.06 |
| $CeO_2$ | 0.26 | 0.26 | 0.26 | 0.26 | 0.26 |
| $MnO_2$ (80%) | 0.03 | 0.05 | 0.05 | 0.05 | 0.05 |
| $Co_3O_4$ | — | — | — | — | — |
| Glass composition (% by weight) |  |  |  |  |  |
| $SiO_2$ | 71 | 71 | 71 | 71 | 71 |
| $Al_2O_3$ | 2 | 2 | 2 | 2 | 2 |
| CaO | 11.3 | 11.3 | 11.3 | 11.3 | 11.3 |
| MgO | 0.15 | 0.15 | 0.15 | 0.15 | 0.15 |
| $Na_2O$ | 12.5 | 12.5 | 12.5 | 12.5 | 12.5 |
| $K_2O$ | 1.4 | 1.4 | 1.4 | 1.4 | 1.4 |
| $SO_3$ | 0.21 | 0.24 | 0.29 | 0.23 | 0.28 |
| Cerium oxide (calculated as $CeO_2$) | 0.20 | 0.20 | 9.20 | 0.20 | 0.20 |
| $Fe_2O_3$ | 0.026 | 0.027 | 0.027 | 0.027 | 0.029 |
| FeO | 0.0036 | 0.0035 | 0.0027 | 0.0027 | 0.0015 |
| Manganese oxide (calculated as MnO) | 0.013 | 0.024 | 0.026 | 0.025 | 0.025 |
| Cobalt oxide (calculated as CoO) | — | — | — | — | — |
| Color values |  |  |  |  |  |
| Y (%) | 89.2 | 89.1 | 88.9 | 89.1 | 88.7 |
| $\lambda_d$(nm) | 567.0 | 565.5 | 567.8 | 565.6 | 569.7 |
| Pe (%) | 0.83 | 0.79 | 0.85 | 0.79 | 1.0 |
| Transmittance (%) (330 nm) | 3.4 | 3.7 | 3.7 | 3.9 | 3.9 |
| Transmittance (%) (420~780 nm) | >88 | >88 | >88 | >88 | >88 |

TABLE 3

|  | Example 11 | Example 12 | Example 13 | Example 14 | Example 15 | Control example 1 | Control example 2 |
|---|---|---|---|---|---|---|---|
| Batch composition (part(s) by weight) |  |  |  |  |  |  |  |
| Kemerton silica sand | — | 100 | 100 | 100 | 100 | 100 | 100 |
| Sarawaku silica sand | 100 | — | — | — | — | — | — |
| Soda ash | 27.5 | 27.5 | 27.5 | 27.5 | 27.5 | 27.5 | 27.5 |
| Limestone | 27.5 | 27.5 | 27.5 | 27.5 | 27.5 | 27.5 | 27.5 |
| Salt cake | 1.4 | 1.4 | 1.2 | 0.7 | 1.4 | 1.6 | 1.0 |
| Carbon (85%) | 0.04 | 0.04 | 0.03 | 0.15 | 0.04 | 0.06 | 0.06 |

TABLE 3-continued

|  | Example 11 | Example 12 | Example 13 | Example 14 | Example 15 | Control example 1 | Control example 2 |
|---|---|---|---|---|---|---|---|
| $CeO_2$ | 0.53 | 0.81 | 1.08 | 1.08 | 0.81 | 0.15 | 0.26 |
| $Fe_2O_3$ | — | 0.042 | 0.014 | — | 0.065 | — | — |
| $MnO_2$ (80%) | 0.12 | 0.07 | 0.05 | 0.05 | 0.13 | 0.045 | 0.05 |
| $Co_3O_4$ | 0.00026 | — | — | 0.0001 | 0.0001 | 0.00015 | 0.0001 |
| Glass composition (% by weight) | | | | | | | |
| $SiO_2$ | 72 | 71 | 71 | 71 | 71 | 71 | 71 |
| $Al_2O_3$ | 2 | 2 | 2 | 2 | 2 | 2 | 2 |
| CaO | 11.5 | 11.3 | 11.3 | 11.3 | 11.3 | 11.3 | 11.3 |
| MgO | 0.15 | 0.15 | 0.15 | 0.15 | 0.15 | 0.15 | 0.15 |
| $Na_2O$ | 12.7 | 12.5 | 12.5 | 12.5 | 12.5 | 12.5 | 12.5 |
| $K_2O$ | 0.1 | 1.4 | 1.4 | 1.4 | 1.4 | 1.4 | 1.4 |
| $SO_3$ | 0.29 | 0.32 | 0.39 | 0.17 | 0.30 | 0.25 | 0.19 |
| Cerium oxide (calculated as $CeO_2$) | 0.40 | 0.61 | 0.81 | 0.80 | 0.62 | 0.11 | 0.20 |
| $Fe_2O_3$ | 0.019 | 0.058 | 0.039 | 0.027 | 0.075 | 0.021 | 0.022 |
| FeO | 0.0008 | 0.0016 | 0.0006 | 0.003 | 0.002 | 0.006 | 0.009 |
| Manganese oxide (calculated as MnO) | 0.067 | 0.037 | 0.024 | 0.025 | 0.072 | 0.027 | 0.025 |
| Cobalt oxide (calculated as CoO) | 0.0002 | — | — | 0.0001 | 0.0001 | 0.00012 | 0.0001 |
| Color values | | | | | | | |
| Y (%) | 85.5 | 86.8 | 86.6 | 86.0 | 86.1 | 86.6 | 88.9 |
| $\lambda_d$ (nm) | 575.0 | 570.8 | 572.3 | 571.0 | 573.5 | 560.6 | 561.8 |
| Pe (%) | 1.2 | 1.3 | 1.8 | 1.9 | 1.5 | 0.41 | 0.71 |
| Transmittance (%) (330 nm) | 3.2 | 2.6 | 2.5 | 2.9 | 2.4 | 5.0 | 3.6 |
| Transmittance (%) (420~780 nm) | >88 | >88 | >88 | >88 | >88 | >88 | >88 |

Industrial Applicability

The present invention enables production of ultraviolet radiation-absorbing, colorless, transparent soda-lime-silica glass and glass bottles formed out of the glass which, while having high transmittance to light in the visible region, absorbs ultraviolet radiation. Therefore, it is applicable to production of glass bottles which can prevent coloration, discoloration, fading in color or deterioration of the flavor of the contents, inter alia, glass bottles which can prevent a yellowing in color of refined "sake" and coloration or fading in color of wines, as well as deterioration of the flavor of refined "sake" and wines.

What is claimed is:

1. An ultraviolet radiation-absorbing, colorless, transparent soda-lime-silica glass which is characterized in that its composition includes, in % by weight,

| | |
|---|---|
| $SO_3$ | 0.15–0.4% |
| Cerium oxide | 0.2–1% (calculated as $CeO_2$) |
| $Fe_2O_3$ | 0.01–0.08% |
| FeO | 0–0.008% |
| Manganese oxide | 0.01–0.08% (calculated as MnO), and |
| Cobalt oxide | 0–0.0005% (calculated as CoO). |

2. The ultraviolet radiation-absorbing, colorless, transparent soda-lime-silica glass of claim 1 which has, on a transmittance curve obtained with a 3.5-mm thick sample, transmittance of not more than 4.5% at the wavelength of 330 nm and has, in the visible region of 420–780 nm, transmittance of not less than 88% without having absorption at any particular wavelength.

3. The ultraviolet radiation-absorbing, colorless, transparent soda-lime-silica glass of claim 2 which has dominant wavelength ($\lambda_d$) at 565–575 nm.

4. The ultraviolet radiation-absorbing, colorless, transparent soda-lime-silica glass of claim 1 which has dominant wavelength ($\lambda_d$) at 565–575 nm.

5. A glass bottle formed out of the ultraviolet radiation-absorbing, colorless, transparent soda-lime-silica glass of claim 1.

6. A glass bottle formed out of the ultraviolet radiation-absorbing, colorless, transparent soda-lime-silica glass of claim 2.

7. A glass bottle formed out of the ultraviolet radiation-absorbing, colorless, transparent soda-lime-silica glass of claim 4.

8. An ultraviolet radiation-absorbing, colorless, transparent soda-lime-silica glass which is characterized in that its composition includes, in % by weight,

| | |
|---|---|
| $SO_3$ | 0.2–0.38% |
| Cerium oxide | 0.2–1% (calculated as $CeO_2$) |
| $Fe_2O_3$ | 0.015–0.06% |
| FeO | 0–0.006% |
| Manganese oxide | 0.013–0.07% (calculated as MnO), and |
| Cobalt oxide | 0–0.0005% (calculated as CoO). |

9. The ultraviolet radiation-absorbing, colorless, transparent soda-lime-silica glass of claim 8 which has, on a transmittance curve obtained with a 3.5 mm thick sample, transmittance of not more than 4.5% at the wavelength of 330 nm and has, in the visible region of 420–780 nm, transmittance of not less than 88% without having absorption at any particular wavelength.

10. The ultraviolet radiation-absorbing, colorless, transparent soda-lime-silica glass of claim 9 which has dominant wavelength ($\lambda_d$) at 565–575 nm.

11. A glass bottle formed out of the ultraviolet radiation-absorbing, colorless, transparent soda-lime-silica glass of claim 8.

12. The ultraviolet radiation-absorbing, colorless, transparent soda-lime-silica glass comprising, in % by weight:

| | |
|---|---|
| $SiO_2$ | 65–75% |
| $Al_2O_3$ | 0–5% |

-continued

| | |
|---|---|
| CaO | 6–15% |
| MgO | 0–4% |
| Na$_2$O | 10–17% |
| K$_2$O | 0–4% |
| SO$_3$ | 0.15–0.4% |
| Cerium oxide | 0.2–1% (calculated as CeO$_2$) |
| Fe$_2$O$_3$ | 0.01–0.08% |
| FeO | 0–0.008% |
| Manganese oxide | 0.01–0.08% (calculated as MnO) |
| Cobalt oxide | 0–0.0005% (calculated as CoO). |

13. The ultraviolet radiation-absorbing, colorless, transparent soda-lime-silica glass of claim 12 which has, on a transmittance curve obtained with a 3.5 mm thick sample, transmittance of not more than 4.5% at the wavelength of 330 nm and has, in the visible region of 420–780 nm, transmittance of not less than 88% without having absorption at any particular wavelength.

14. The ultraviolet radiation-absorbing, colorless, transparent soda-lime-silica glass of claim 13 which has dominant wavelength ($\lambda_d$) at 565–575 nm.

15. A glass bottle formed out of the ultraviolet radiation-absorbing, colorless, transparent soda-lime-silica glass of claim 12.

16. An ultraviolet radiation-absorbing, colorless, transparent soda-lime-silica glass comprising, in % by weight:

| | |
|---|---|
| SiO$_2$ | 65–75% |
| Al$_2$O$_3$ | 0–5% |
| CaO | 6–15% |
| MgO | 0–4% |
| Na$_2$O | 10–17% |
| K$_2$O | 0–4% |
| SO$_3$ | 0.2–0.38% |
| Cerium oxide | 0.2–1% (calculated as CeO$_2$) |
| Fe$_2$O$_3$ | 0.015–0.06% |
| FeO | 0–0.006% |
| Manganese oxide | 0.013–0.07% (calculated as MnO) |
| Cobalt oxide | 0–0.0005% (calculated as CoO). |

17. The ultraviolet radiation-absorbing, colorless, transparent soda-lime-silica glass of claim 16 which has, on a transmittance curve obtained with a 3.5 mm thick sample, transmittance of not more than 4.5% at the wavelength of 330 nm and has, in the visible region of 420–780 nm, transmittance of not less than 88% without having absorption at any particular wavelength.

18. The ultraviolet radiation-absorbing, colorless, transparent soda-lime-silica glass of claim 17 which has dominant wavelength ($\lambda_d$) at 565–575 nm.

19. A glass bottle formed out of the ultraviolet radiation-absorbing, colorless, transparent soda-lime-silica glass of claim 16.

20. An ultraviolet radiation-absorbing, colorless, transparent soda-lime-silica glass comprising, in % by weight:

| | |
|---|---|
| SiO$_2$ | 68–74% |
| Al$_2$O$_3$ | 1–4% |
| CaO | 8–13% |
| MgO | 0.1–3% |
| Na$_2$O | 11–15% |
| K$_2$O | 0.1–3% |
| SO$_3$ | 0.24–0.35% |
| Cerium oxide | 0.3–0.8% (calculated as CeO$_2$) |
| Fe$_2$O$_3$ | 0.02–0.04% |
| FeO | 0–0.004% |
| Manganese oxide | 0.02–0.05% (calculated as MnO) |
| Cobalt oxide | 0–0.0003% (calculated as CoO). |

21. The ultraviolet radiation-absorbing, colorless, transparent soda-lime-silica glass of claim 20 which has, on a transmittance curve obtained with a 3.5 mm thick sample, transmittance of not more than 4.5% at the wavelenght of 330 nm and has, in the visible region of 420–780 nm, transmittance of not less than 88% without having absorption at any particular wavelenght.

22. The ultraviolet radiation-absorbing, colorless, transparent soda-lime-silica glass of claim 21 which has dominant wavelength ($\lambda_d$) at 565–575 nm.

23. A glass bottle formed out of the ultraviolet radiation-absorbing, colorless, transparent soda-lime-silica glass of claim 20.

* * * * *